United States Patent [19]

Burtzlaff et al.

[11] Patent Number: 4,939,438
[45] Date of Patent: Jul. 3, 1990

[54] RELAY CONTROL ASSEMBLY

[75] Inventors: Richard J. Burtzlaff, Denver; Christopher D. Tillman, Lakewood, both of Colo.

[73] Assignee: Orbital Sciences Corporation II, Fairfax, Va.

[21] Appl. No.: 57,920

[22] Filed: Jun. 2, 1987

Related U.S. Application Data

[63] Continuation of Ser. No. 840,118, Mar. 14, 1986, abandoned.

[51] Int. Cl.⁵ ............................................. H02P 3/08
[52] U.S. Cl. ................................. 318/564; 318/434; 318/471; 361/28; 361/31
[58] Field of Search ........................... 318/310–345, 318/599, 601, 603, 607, 608, 610, 611, 612, 613, 614, 632, 568, 567, 565, 569, 570, 571, 572, 564, 430–485; 901/9, 18–24; 364/513; 361/23–31

[56] References Cited

U.S. PATENT DOCUMENTS

| | | | |
|---|---|---|---|
| 3,190,586 | 6/1965 | Righton | 318/564 |
| 3,505,929 | 4/1970 | Coppola | 318/564 |
| 3,809,975 | 5/1974 | Bartels | 318/332 X |
| 3,912,994 | 10/1975 | Stovall | 318/341 |
| 3,988,641 | 10/1976 | Hentschel et al. | 361/31 |
| 4,052,625 | 10/1977 | Cameron | 361/31 X |
| 4,156,162 | 5/1979 | Warfield et al. | 318/434 |
| 4,189,732 | 2/1980 | Atwater | 318/341 X |
| 4,217,616 | 8/1980 | Jessup | 361/31 |
| 4,230,977 | 10/1980 | Nelson | 318/434 X |
| 4,241,299 | 12/1980 | Bertone | 318/341 X |
| 4,306,181 | 12/1981 | Welburn | 318/599 X |
| 4,313,402 | 2/1982 | Lehnhoff et al. | 318/471 X |
| 4,345,288 | 8/1982 | Kampf et al. | 361/31 |
| 4,381,480 | 4/1983 | Hara et al. | 318/471 |
| 4,503,370 | 3/1985 | Cuneo | 318/345 H X |
| 4,524,309 | 6/1985 | Hisatake et al. | 318/434 |
| 4,568,996 | 2/1986 | McElhenny | 361/31 |
| 4,591,769 | 5/1986 | Beckerman | 318/314 X |
| 4,680,517 | 7/1987 | Fujioka | 318/332 |
| 4,694,371 | 9/1987 | Reinhardt et al. | 361/28 X |
| 4,748,389 | 5/1988 | Nakakuki | 318/434 X |

Primary Examiner—William M. Shoop, Jr.
Assistant Examiner—Paul Ip
Attorney, Agent, or Firm—Kirkland & Ellis

[57] ABSTRACT

The present invention comprises a relay control circuit that provides highly efficient and reliable control for devices that perform in demanding applications such as space. Multiple levels of redundant function control are provided by redundant actuators that perform mechanical operations. Each actuator is driven by redundant motors for increased reliability. Motor current sensing is provided to determine arrival of the actuator at mechanical stops, which are located at the full deploy position. Limit switches also sense when the actuators are in the full deploy position. In addition, multiple control signal so are required to initiate certain critical operations. Critical operations also are performed redundantly for increased reliability.

15 Claims, 3 Drawing Sheets

RELAY CONTROL ASSEMBLY

This is a continuation of co-pending application Ser. No. 840,118 filed on Mar. 14, 1986 now abandoned.

BACKGROUND OF THE INVENTION

1. Field of the Invention

This invention relates broadly to the field of electrical controllers, and in particular relates to a relay control circuit that provides highly reliable control for devices that perform in demanding environments such as space.

2. Brief Description of the Prior Art

Electrochemical relays have traditionally been utilized to control motors and other electrical devices. Electromechanical relays allow electrical devices with varying voltage and current requirements to be controlled with a standard voltage level such as from a switch panel. A controller that uses electromechanical relays in the conventional manner has important disadvantages for applications such as for use in space. First, the failure of an electromechanical relay or the device controlled thereby may result in the aborting of an important part of a space mission. For example, the failure of a motor which drives an actuator that unlatches a satellite for release from a spacecraft may prevent the satellite from being launched. Returning the satellite to earth results in a great waste of time and expense.

Another disadvantage of conventional controllers is that the failure of a single electromechanical relay or switch could result in premature performance of a time critical operation. For example, release of the satellite prior to full opening of the spacecraft cargo doors could result in serious damage to the spacecraft and satellite.

Finally, conventional controllers of motor driven actuators often use only limit switches to detect completion of the desired movement. The use of limit switches alone provides no short-circuit protection for the power source nor force-limiting protection in the event of obstruction of the actuator.

Accordingly, it is an object of the present invention to provide a highly reliable electromechanical relay control circuit that utilizes multiple levels of redundant function control.

It is a further object of the present invention to provide a safe electromechanical relay control circuit that requires the receipt of multiple control signals before time-critical operations are performed.

Finally, it is an object of the present invention to provide motor current sensing to detect full travel of the actuator driven by the motor being controlled as well as to provide short-circuit protection for the power source and force limiting protection in the event of obstruction of the actuator driven by the motor.

SUMMARY OF THE INVENTION

The present invention is an electromechanical relay circuit for powering motors that effectuate desired mechanical operations. In the preferred embodiment there are three such mechanical operations, namely the latch, rotate and tilt operations, these operations being necessary to position a spacecraft payload for deployment from the cargo bay of a shuttle orbiter or other spacecraft.

The present invention achieves high reliability by utilizing multiple levels of redundancy. For each of the mechanical operations, there is both a "primary" and a "secondary" actuator, either of which can be driven to achieve the desired mechanical operation. Further, each primary and secondary actuator can be driven by either of two motors (i.e., an "A" and a "B" motor) connected thereto to achieve the desired mechanical operation. Thus, there are a total of six actuators and twelve motors. For example, if the A motor connected to the primary actuator that performs the rotate operation fails, the astronaut can switch to the B motor of the same actuator to perform the rotate operation. Further, if the B motor connected to the primary actuator fails, or if the primary actuator itself fails, the astronaut can disengage the primary actuator and utilize the A motor of the secondary actuator to perform the rotate operation. Still further, if the A motor connected to the secondary actuator fails, the astronaut can switch to the B motor connected to the secondary actuator to perform the rotate operation. This redundancy, which exists for all three of the mechanical operations of the preferred embodiment, greatly increases reliability and probability of mission success.

In addition to or in place of using conventional limit switches for determining that complete operation of each actuator has occurred, in the present invention, the current drawn by each motor is monitored through a current-sense resistor. When the motor current exceeds a preselected maximum value, the motor is deactivated. A mechanical stop is placed at the desired termination point of actuator travel for each actuator. When an actuator operates to the point where further travel is prevented by the mechanical stop, the current drawn by the motor driving the actuator increases. This current increase is detected by sensing the voltage drop across the current-sense resistor. When the voltage drop exceeds a reference voltage level, which corresponds to a preselected maximum current value, the relay supplying power to the motor is deactivated.

Limiting the motor current in this manner provides short-circuit protection for the power source as well as force-limiting protection in the event of obstruction of the actuator. This method deactivates each motor upon complete operation of the actuator it is driving without using only travel limit switches, which tend to be less reliable. If for some reason full actuator travel has not been achieved prior to the overcurrent condition, the current sense circuitry can be overridden manually to activate the motor until the actuator has travelled the full distance required.

In alternative embodiments, potentiometers are utilized to measure the mechanical travel of each of the actuators. Conventional circuitry converts the voltage drop across the potentiometer, which reflects the distance traveled by the actuator, into an analog indication of actuator position.

In addition to motors for driving actuators, the present invention also contains circuitry for activating devices that perform critical operations. In the preferred embodiment, such devices include pyrotechnic pin-puller devices that are activated to disconnect any primary actuator in the event of a failure such of primary actuator or of both the A and B motors driving such primary actuators. The present invention also contains circuitry for firing redundant super-zip pyrotechnic separation devices ("super-zips"). Each super-zip is a pyrotechnic device used to separate the spacecraft payload from the launcher. The pin-puller devices and the super-zips are detonated by pyro-initiator controllers ("PICs") by capacitive discharge. The pin-pulling and separation operations are critical to both reliability and safety. Therefore, the present invention requires the receipt of multiple control signals before these operations are performed.

The present invention thus provides for extensive redundancy for increased reliability, safety and probability of mission success. Further, the present invention achieves this result by a novel method that does not solely rely on travel limit switches to detect completion of actuator operation. Finally, critical operations require the receipt of multiple control signals before these operations are performed.

DETAILED DESCRIPTION OF THE PREFERRED EMBODIMENT

The preferred embodiment of the present invention is adopted for use as part of the airborne support equipment (ASE) for a spacecraft payload carried on a shuttle orbiter of the NASA Space Transportation System. The spacecraft payload could be, for example, a communications satellite mated with an upper stage rocket. The spacecraft payload is supported in the orbiter during deployment and launch by forward and aft cradles (not shown) of the type described in the U.S. patent application for Cradle Apparatus For Supporting Payloads In A Space Vehicle, Ser. No. 786,212, by F. Byers, et al., which has been assigned to the same assignee as the present invention. In order to deploy the upper stage and the mated satellite, a latch actuator (not shown) opens a latch (not shown) on the hinged forward cradle (not shown), a rotate actuator (not shown) rotates the hinged portion (not shown) of the forward cradle (not shown) out of the way and a tilt actuator (not shown) tilts the aft cradle upward in preparation for launch of the upper stage and mated satellite. All mechanical connection of the upper stage and mated satellite to the orbiter is severed by firing a super-zip pyrotechnic separation device (not shown). The upper stage and mated satellite then are deployed from the orbiter cargo bay by a spring (not shown) prior to ignition of the upper stage rocket (not shown).

Figure 1:
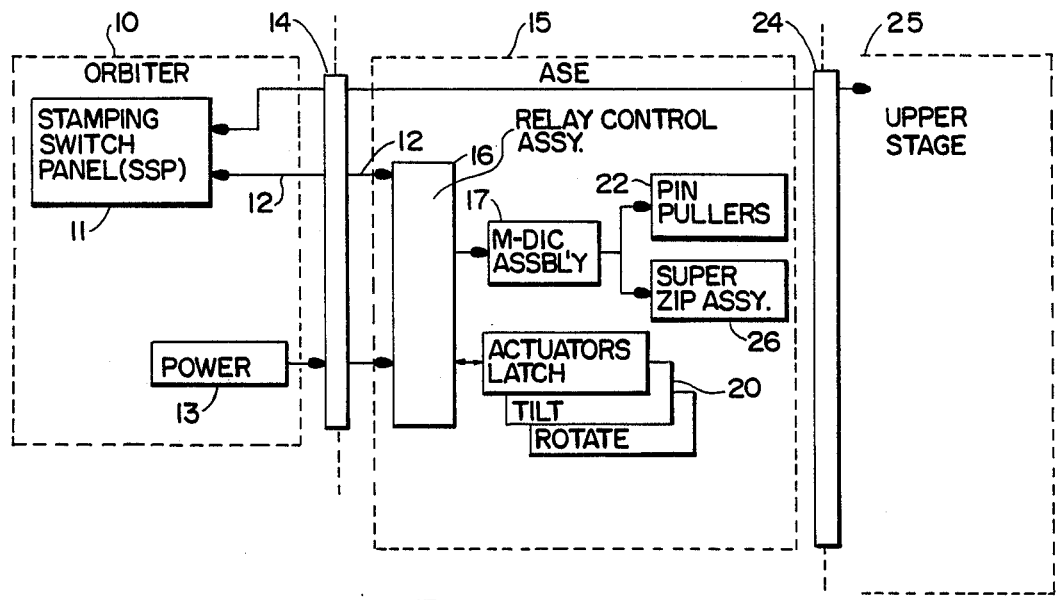
FIG. 1 is a block diagram illustrating the relationship between the present invention and other systems in the preferred embodiment.

With reference to FIG. 1, standard switch panel 11 of the orbiter (not shown) is connected to airborne support equipment (ASE) 15 through interface 14. Upper stage 25 is connected to ASE 15 by staging connectors 24. Relay control assembly 16 of the present invention exchanges control signals with standard switch panel 11 of orbiter 10 through interface 14 and control lines 12. Relay control assembly 16 also receives power from power supply 13 of the orbiter (not shown) through interface 14.

In response to control signals from switch panel 11, relay control assembly 16 activates motors 18A and 18B (see FIG. 2a), which drive actuators 20 to cause them to perform latch, rotate, and tilt operations to position the upper stage and mated satellite (not shown) for deployment and launch. In response to other control signals from switch panel 11, relay control assembly 16 activates multiple pyro-initiator controller ("PIC") assembly 17, which detonates one of pyrotechnic pin-puller devices 22 which disengages a primary actuator (not shown), in the event of actuator or actuator motor failure. PIC assembly 17 of the present invention also includes circuitry for detonating super-zip pyrotechnic separation device 26 ("super-zips"), which separates the upper stage and mated satellite from the shuttle orbiter.

Figure 2A:
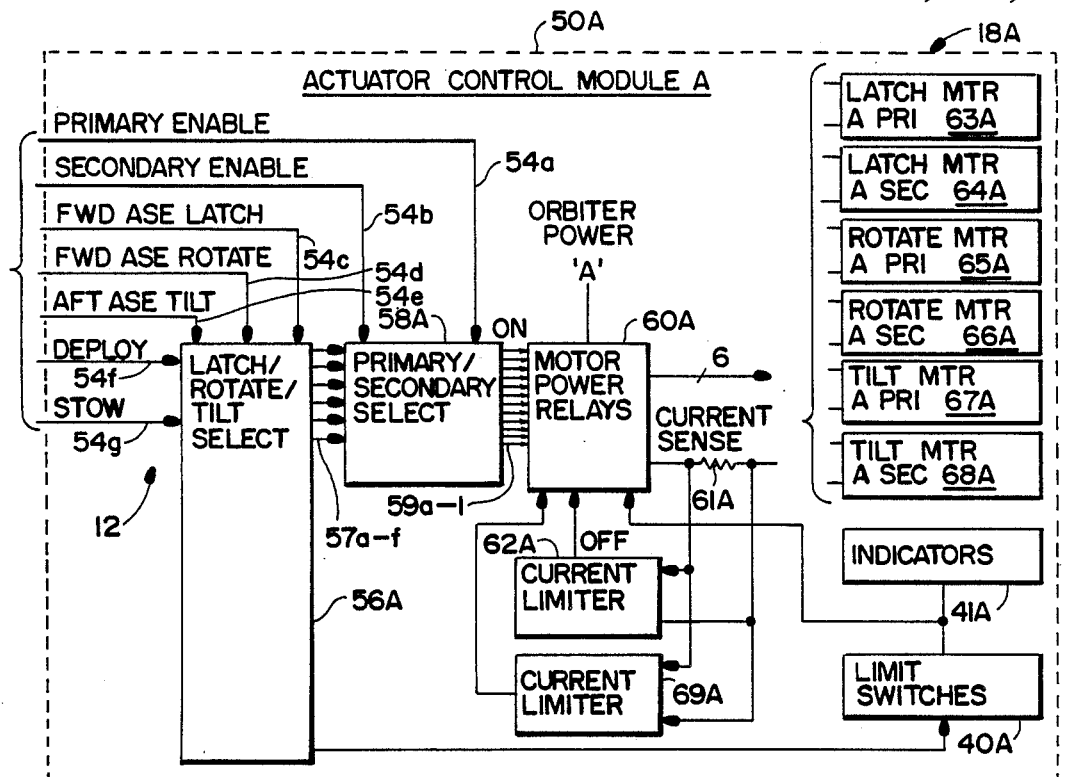
FIGS. 2a and 2b are block diagrams of the present invention.
Figure 2A:
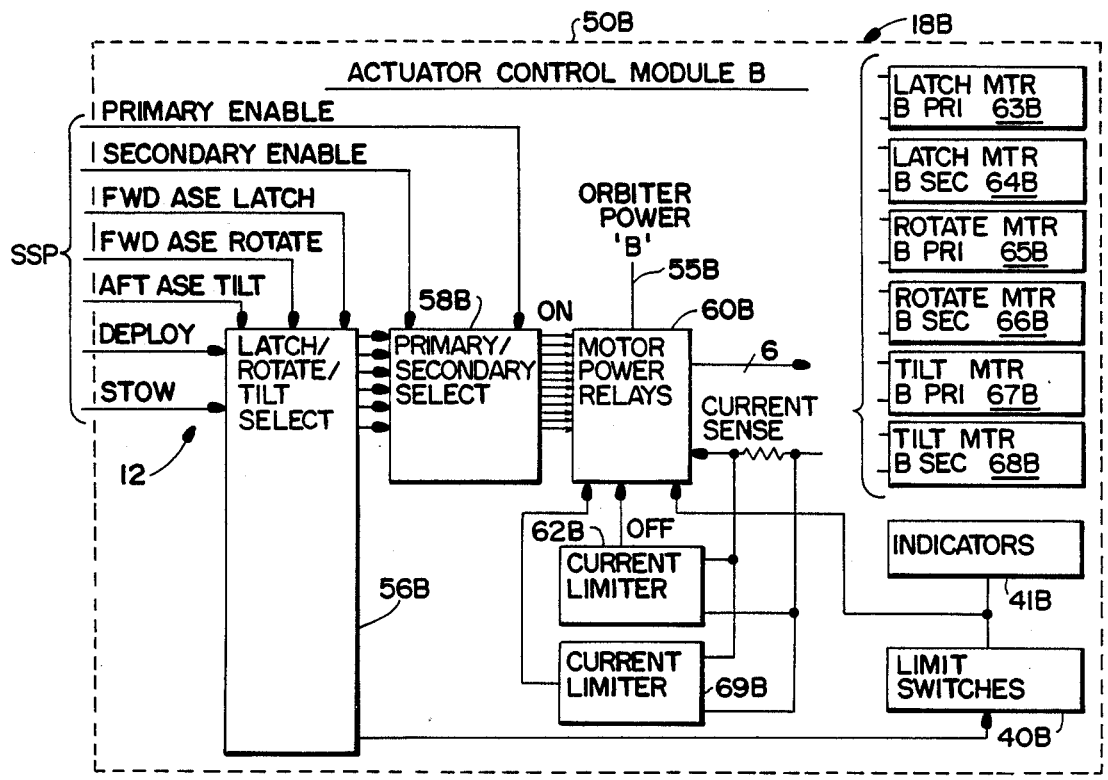

FIG. 2a illustrates the preferred embodiment of relay control assembly 16. Actuator control module 50A controls the "A" motors 63A–68A, which drive the primary and secondary latch, rotate and tilt actuators (not shown). Actuator control module 50B is identical to actuator control module 50A except that it controls the "B" motors 63B–68B, which also drive the primary and secondary latch, rotate and tilt actuators. Selection of module 50A or module 50B is accomplished by selectively switching power from switch panel 11 to either of power inputs 55A or 55B, respectively. For illustrative purposes, only module 50A will be further described in detail, the operation of module 50B being identical.

Actuator control module 50A includes a latch-/rotate/tilt select circuit 56A, which receives control signals 12 (specifically identified as 54a–g) from standard switch panel 11 and outputs six signals 57a–f, one of which is in the on state and the others of which are in the off state. The six signals 57a–f correspond to the deploy and stow modes for each of the latch, rotate and tilt actuators (not shown). Latch/rotate/tilt select circuit 56A is comprised of conventional relay logic circuitry. The latch, rotate and tilt control signals 54c, d and e, respectively, are selectively at a high or low voltage level depending upon the desired operation (i.e., latch control signal 54c is at a high voltage level to select the latch operation, rotate control signal 54d at a high voltage level to select the rotate operation, and tilt control signal signal 54e is at a high voltage level to select the tilt operation). In the preferred embodiment, only one of the three operations is performed at any given time. In alternative embodiments, more than one operation can be selected to occur simultaneously.

The deploy and stow control signals 54f and g, respectively, are also input to latch/rotate/tilt select circuit 56A, and are selectively at a high or low voltage level depending upon whether the actuator is to be operated in the deploy or stow direction.

The primary enable and secondary enable control signals 54a and 54b, respectively, are input to primary/secondary select circuit 58A, which has twelve output signals 59a–l. Each of the output signals 59a–l corresponds to either the deploy or stow direction for one of the six actuators (i.e., the primary and secondary latch, rotate and tilt actuators). All twelve output signals 59a–l drive one of twelve relays that provide power for the two directions of the six "A" motors 63A–68A (i.e., two relays for each motor, one relay providing motor drive power of the polarity for the deploy mode and another relay providing motor drive power of the polarity for the stow mode). Primary/secondary select circuit 58A also is comprised of conventional relay logic circuitry. Primary and secondary enable control signals 54a and 54b, respectively, are selectively at a high or low voltage level depending upon whether a primary or secondary actuator is desired (i.e., when primary enable control signal 54a is high, a primary actuator is selected, and when secondary enable control signal 54b is high, a secondary actuator is selected). In the preferred embodiment, only one actuator in each pair of primary and secondary latch, rotate and tilt actuators is operated at any given time. Accordingly, only one of control signals 54a and 54b is at the high voltage level at any given time.

The twelve output signals 59a-l of primary/secondary select circuit 58A, in response to control signals 54a and 54b and the output signals 57a-f of latch/rotate/tilt select circuit 56A, selectively activate motor power relays 60A. Motor power relays 60A control the power for the "A" motors 63A-68A that drive the primary and secondary, latch, rotate and tilt actuators.

For example, to perform the latch operation in deploying a spacecraft payload, the appropriate switches on standard switch panel 11 (see FIG. 1) are activated to select the deploy mode for either the primary or secondary latch actuator (not shown) (i.e., control signal 54f is at a high voltage level, control signal 54c is at a high voltage level). If the primary latch actuator (not shown) is selected (i.e., control signal 54a is at a high voltage level), control signals 12 from standard switch panel 11 cause the latch/rotate/tilt select circuit 56A and primary/secondary select circuit 58A to activate the relay (not explicitly shown) of motor power relays 60A that provides power to latch A motor 63A to drive the primary latch actuator (not shown) in the deploy direction. If operation of the primary latch actuator is desired but latch A motor 63A fails, another switch (not shown) on standard switch panel 11 can be activated to cause the relay (not shown) of motor power relays array 60B of actuator control module 50B to provide power to latch B motor 63B to drive the primary latch actuator (not shown). Further, if latch B motor 63B fails, the primary latch actuator can be disengaged (the disengagement of the primary actuators is described more fully below) and the latch operation performed by the secondary latch actuator (not shown). The same sequence can then be repeated using latch A motor 64A and latch B motor 64B. Motors 65A, 65B, 66A and 66B for the primary and secondary rotate actuator (not shown), and motors 67A, 67B, 68A and 68B for the primary and secondary tilt actuators (not shown) can be similarly selected to provide multiply redundant performance of these functions.

Still referring to FIG. 2a, the current drawn by whichever of motors 63A-68A is activated flows through current sense resistor 61A. The voltage drop across current sense resistor 61A is monitored by current limiters 62A and 69A. As the current drawn by the activated motor increases, the voltage drop across current sense resistor 61A increases. When this voltage drop exceeds a preselected reference value, such as occurs when the selected actuator reaches the mechanical stop (not shown) at the desired termination point, or when travel of the actuator is otherwise obstructed, current limiters 62A and 69A deactivate the relay of motor power relays 60A that is providing power to the activated motor, thereby stopping the motor. In the preferred embodiment, two current limiters are provided for increased reliability. Current limiters 62A and 69A sense the voltage across sense resistor 61A in parallel, while deactivating the motor if the overcurrent condition is detected in series (i.e., if either of current limiters 62A or 63A detects overcurrent, the relay providing power to the motor is deactivated).

Also in the preferred embodiment, limit switches 40A are provided to determine the arrival of each actuator at the desired termination point. Limit switches 40A, which consist of one limit switch for each of the latch, rotate and tilt operations, receive power from latch/rotate/tilt select circuit 56A. The outputs of limit switches 40A are normally floating, but switch to a positive voltage when activated by arrival of the actuator at the limit switch. In the preferred embodiment, the outputs of limit switches 40A are used to drive indicators 41A, which indicate that the actuator to which the limit switch corresponds has arrived at the desired termination point. In addition, in an alternative embodiment, the outputs of some or all of limit switches 40A deactivate the relay providing power to the motors driving the actuator to which each such limit switch corresponds.

Figure 2B:
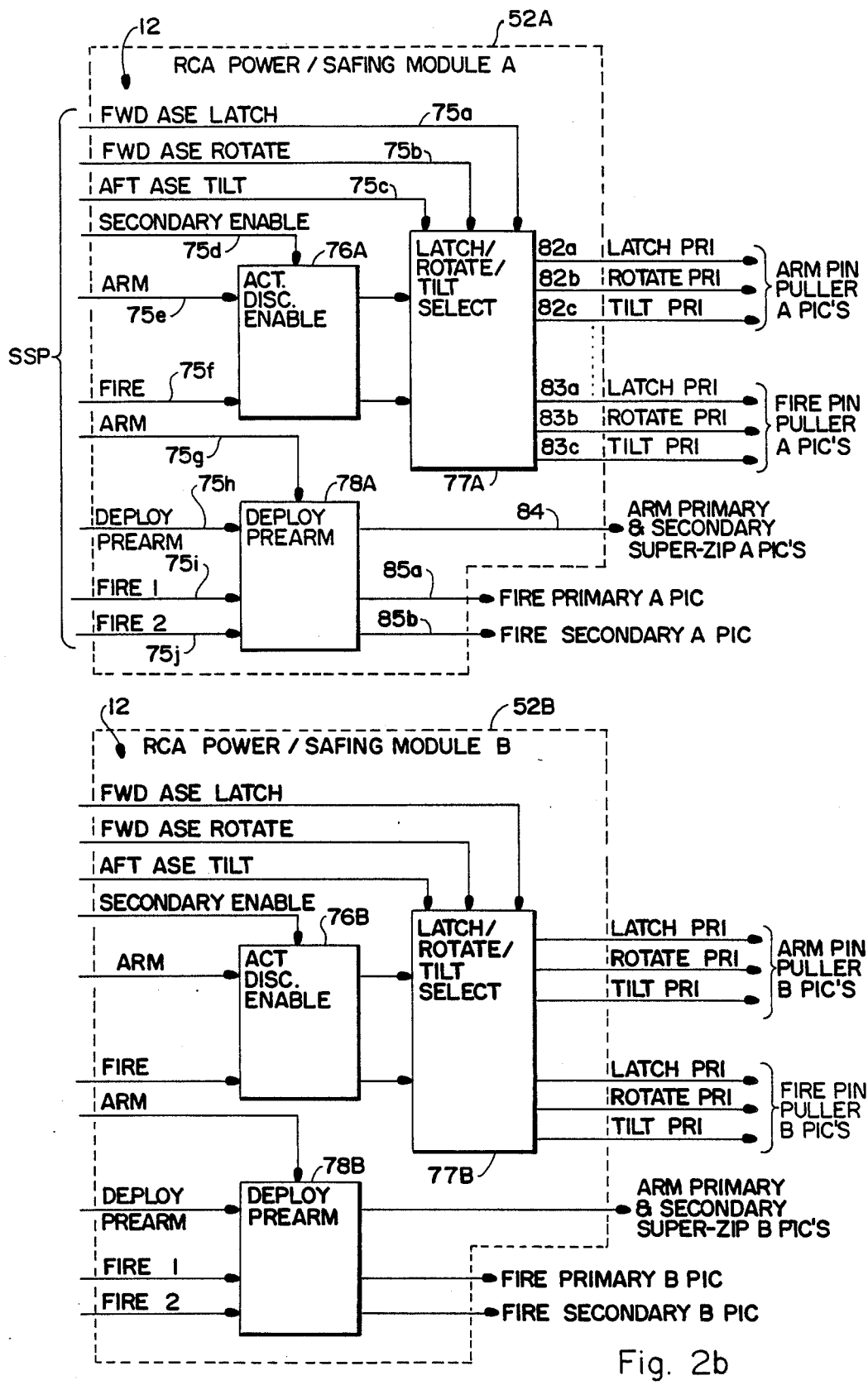

Control signals 12 (specifically identified as 75a-j) from standard switch panel 11 are also used to control the pyrotechnic disengagement of each primary actuator in the event such actuator or both the A and B motors driving such actuator fail. Those signals are applied to redundant power/safing modules 52A and 52B as illustrated in FIG. 2b. Power/safing modules 52A and 52B are identical and operate simultaneously in response to the same control signals 12. The outputs of power/safing modules 52A and 52B operate parallel, identical devices that redundantly perform certain critical operations as more fully described below. Thus, if power/safing module 52A fails, or a device controlled by power/safing module 52A fails, the critical operation will still be performed by power/safing module 52B and another device controlled thereby. Only power/safing module 52A will be more fully described, the operation of power/safing module 52B being identical.

Actuator disconnect enable circuit 76A, latch/rotate/tilt select circuit 77A and deploy/prearm circuit 78A are conventional relay logic circuits that operate as described below.

Latch, rotate and tilt control signals 75a, 75b and 75c, respectively, from standard switch panel 11 (see FIG. 1) are input to latch/rotate/tilt select circuit 77A. Each of signals 75a, 75b or 75c is at a high voltage level when the switch (not shown) on standard switch panel 11 has been thrown to disconnect the primary latch, rotate or tilt actuator, respectively, and is at a low voltage level otherwise. In the preferred embodiment, actuator disconnect enable circuit 76A will not respond to an arm output control signal 76a or a fire output control signal 76b, and the disconnect operation cannot be performed, unless secondary enable control signal 75d is at a high voltage level, which indicates that the secondary actuator (not shown) corresponding to the primary actuator to be disconnected has been enabled. Thus, arm control signal 75e and fire control signal 75f are propagated to latch/rotate/tilt select circuit 77A only if secondary enable signal 75d is high. Depending upon which of the latch, rotate or tilt control signals 75a, 75b or 75c, respectively, is at a high voltage level, an arm control signal 75e or a fire control signal 75f will be propagated to one of outputs 82a-c of latch/rotate/tilt select 77A. Arm output signals 82a, 82b and 82c selectively arm the PICs associated with the pyrotechnic pin-puller devices (not shown) for the latch, rotate and tilt actuators (not shown), respectively. Fire output signals 83a, 83b and 83c selectively fire the PICs associated with the pyrotechnic pin-puller devices (not shown) for the latch, rotate and tilt actuators (not shown), respectively. When fired, the pyrotechnic pin-puller devices disconnect the selected primary actuator, which is done in the event that the selected primary actuator fails or in the event that both motors driving such primary actuator fail. The disconnect operation is not performed until the related pyrotechnic pin-puller device is "armed" by receipt of an arm output signal from one of arm outputs 82a-c, and while armed, the selected pyrotechnic pin-puller device receives a fire output signal from the corresponding fire output 83a, b, or c. In the preferred embodiment, an arm signal is used to charge a capacitor bank (not shown) in the multiple pyrotechnic initiator controller ("PIC") assembly 17 (see FIG. 1). Each pin puller (not shown) can be operated by either or both of two pyrotechnic devices (not shown), and multiple PIC assembly 17 includes a separate PIC for each pyrotechnic device.

For example, to disconnect the primary rotate actuator (not shown), rotate select control ssignal 75b is switched to a high voltage level by a switch (not shown) on standard switch panel 11, and secondary enable control signal 75d is switched to a high voltage level by the same or another switch on standard switch panel 11. When a switch (not shown) controlling the arm function on standard switch panel 11 is then activated, arm control signal 75e becomes a high voltage level, and rotate arm signal 82b becomes a high voltage level. When a switch (not shown) on standard switch panel 11 controlling the fire function is then activated, fire control signal 75f becomes a high voltage level, rotate fire signal 83b becomes a high voltage level, the pin-puller A PIC in multiple PIC assembly 17 (See FIG. 1) capacitively discharges and fires pin-puller A, and the primary rotate actuator is disconnected. As discussed below, the same control signals 12 are received by power/safing module 52B, which simultaneously causes the pin-puller B to fire, which would disconnect the primary rotate actuator even if the pin-puller A PIC failed to fire or the pyrotechnic device controlled by the A PIC failed to detonate. In the preferred embodiment each PIC discharges its capacitor bank into a detonator wire of the pyrotechnic device it controls in response to a fire signal.

Similarly, in response to multiple control signals from standard switch panel 11, deploy prearm circuit 78A generates an arm primary and secondary super-zip A pyrotechnic initiator controller signal 84 and fire primary and secondary super-zip A PIC signals 85a and 85b.

Deploy prearm circuit 78A also is comprised of conventional relay logic circuitry. The super-zip pyrotechnic separation device ("super-zip") (not shown) is another pyrotechnic device, this one being used to sever all mechanical connection between the spacecraft payload being deployed and the orbiter. In the preferred embodiment, both a primary and a secondary super-zip are ued, either or both of which can sever the mechanical connection. When a corresponding switch (not shown) on standard switch panel 11 is actuated, deploy prearm control signal 75h is at a high voltage level. With deploy prearm control signal 75h at a high voltage level, when arm control signal 75g goes to a high voltage level, arm A super-zip signal 84a goes to a high voltage level. In the preferred embodiment, deploy prearm control signal 75h musst be at a high voltage level before outputs 84 and 85a, b of deploy/prearm circuit 78A can obtain a high voltage level. Then, when switches corresponding to fire commands for primary and secondary PICs of super-zip A are activated on standard switch panel 11, fire primary and fire secondary control signals 75i and 75j, respectively, go to a high voltage level, fire primary A PIC output signal 85a and fire secondary A PIC output signal 85b go to a high voltage level, causing the PIC associated with each to discharge its capacitor back into the detonator wire of the primary and secondary A super-zips, respectively, causing each to explode when so detonated. The primary and secondary A super-zips can, but need not, both be detonated simultaneously.

Redundant power/safing module 52B simultaneously performs the same functions as power/safing module 52A in response to the same control signals 75, thereby allowing the PICs for pin-pullers B of the primary actuators and the primary and secondary of the super-zip B pyrotechnic device to be armed and fired in the event of a failure of power/safing module 52A or of the A pin-pullers or the A super-zip pyrotechnic devices.

In the preferred embodiment, control signals 54a-g are applied to both modules 50A and 50B, and control signals 75a-j are applied to both power/safing modules 52A and 52B. Also in the preferred embodiment, control signal 75a is the same as control signal 54c, control signal 75b is the same as control signal 54d, control signal 75c is the same as control signal 54e and control signal 75d is the same as control signal 54b. In other embodiments, some or all or these control signals are independent.

Figure 3:
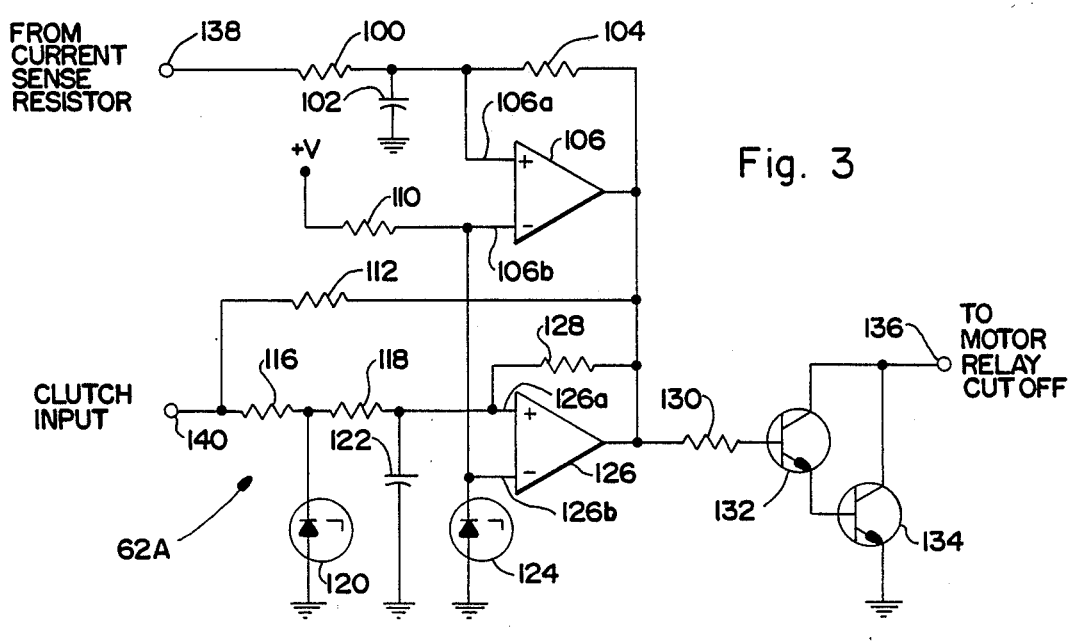
FIG. 3 is a schematic diagram of one of the current sensor circuits of the present invention.

Referring now to FIG. 3, current limiters 62A and 69A (which are identical) of FIG. 2a will be further described. Connection point 138 is presented by conventional means with a voltage with respect to ground that corresponds to the voltage drop across motor current sense resistor 61A (see FIG. 2a). This voltage is filtered by the charging of capacitor 102 through resistor 100, and is then presented to the non-inverting input of voltage comparator 106. Voltage comparator 106 is an open-collector gate whose output is a high impedance to ground potential when the voltage presented to non-inverting input 106a exceeds the voltage presented to inverting input 106b, and whose output is a low impedance to ground potential when the voltage presented to inverting input 106b exceeds the voltage presented to non-inverting input 106a. Resistor 104 is selected to be of sufficiently high resistance so that voltage comparator 106 operates with moderate hysteresis. A reference voltage level that corresponds to the maximum desired motor current is established by resistor 110 and voltage reference diode 124, which is presented to inverting input 106b of voltage comparator 106, and also to inverting input 126b of voltage comparator 126, the operation of which is more fully described below. When the maximum motor current is exceeded, the voltage presented to non-inverting input 106a of voltage comparator 106 will exceed the reference voltage level presented to the inverting input 106b of voltage comparator 106. This results in the voltage comparator output switching from a low impedance to ground potential to a high impedance to ground potential. The action of transistors 132 and 134, in response to voltage comparator 106 will be more fully discussed below.

Still referring to FIG. 3, the clutch circuitry included in current limiter 62A of the present invention will now be described. A clutch signal is received from the clutch (not shown) of the motor (i.e., one of motors 63A–68A, FIG. 2a) at connection point 140 upon start-up of the motor and initial clutch engagement. The input to connection point 140 floats until the motor (i.e., one of motor 63A–68A) is activated by one of motor power relays 60A. When the motor is activated the voltage at clutch input 140 goes to a positive level and resistor 116 and voltage reference diode 120 establish a reference voltage that begins to charge capacitor 122 through resistor 118. The charging time of capacitor 122 is determined by the reference voltage established by resistor 116 and voltage reference diode 120 and the resistance and capacitance, respectively, of resistor 118 and capacitor 122.

The voltage on capacitor 122 is presented to non-inverting input 126a of voltage comparator 126. Voltage comparator 126 also is an open-collector gate whose output is a high impedance to ground potential when the voltage presented to non-inverting input 126a exceeds the voltage presented to inverting input 126b, and whose output is a low impedance to ground potential when the voltage presented to inverting input 126b exceeds the voltage presented to non-inverting input 126a. The reference voltage established by resistor 110 and voltage reference diode 124 is presented to inverting input 126b of voltage comparator 126. Resistor 128 is selected to be of sufficiently high resistance so that voltage comparator 126 operates with moderate hysteresis. Resistor 112 is a pull-up resistor for the outputs of open collector voltage comparators 106 and 126. For transistors 132 and 134 to conduct thereby deactivating the motor relay (not shown) of motor power relays 60A, clutch input 140 must be positive and the outputs of both voltage comparators 106 and 126 must be high impedances to ground potential.

Current limiter 62A operates as described below. Upon motor turn-on, a positive voltage is presented to clutch input connection point 140. Because of structure inertia, the motor current may temporarily exceed the predetermined maximum value and a temporary motor over-current condition may be sensed by voltage comparator 106. Transistors 132 and 134 remain in the non-conducting state, however, because the voltage on capacitor 122, which is presented to non-inverting input 126a of voltage comparator 126, is less than the reference voltage established by resistor 110 and voltage reference diode 124, which is presented to inverting input 126b of voltage comparator 126. The output of voltage comparator 126 thus is a low impedance to ground potential and transistors 132 and 134 are held in a non-conducting state.

The over-current condition created by the start-up inertia exists for only a short period of time. When the over-current condition subsides, the output of voltage comparator 106 is a low impedance to ground potential, and transistors 132 and 134 will be held in the non-conducting state regardless of the state of the output of voltage comparator 126. The charging time required for the voltage across capacitor 122 to exceed the reference voltage established by resistor 110 and voltage reference diode 124 is selected to be greater than the duration of the normal start-up over-current condition. When the voltage on capacitor 122 exceeds the reference voltage established by resistor 110 and voltage reference diode 124, the output of voltage comparator 126 switches to a high impedance to ground potential. As described above, transistors 132 and 134 remain non-conducting because the output of voltage comparator 106 by then is a low impedance to ground potential.

If the actuator (not shown) being driven by the motor is obstructed or reaches the mechanical stop (not shown) at the termination point, the current drawn by the motor increases, thereby causing the voltage presented to connection point 138 to increase and the voltage on capacitor 102 to begin increasing. When the voltage on capacitor 102 exceeds the reference voltage established by resistor 110 and varactor diode 124, the output of voltage comparator 106 switches to a high impedance to ground potential. With the outputs of both voltage comparators 106 and 126 at a high impedance to ground potential, the current induced by the positive voltage at connection point 140 flows through resistors 112 and 130 into the base of transistor 132. Transistor 132 begins to conduct, which causes transistor 134 to conduct, and connection point 136 is pulled to near ground potential. In the preferred embodiment, connection point 136 is connected to a relay coil (not shown) in motor power relays 60A of FIG. 2a, the opposite terminal of which is connected to a positive voltage. When connection point 136 is pulled to near ground potential, current flows through the relay coil connected to connection point 136, which, in the preferred embodiment, deactivates the relay that is providing power to the selected motor.

Thus, the circuit of FIG. 3 inhibits the over-current condition caused by the start-up inertia of the motor from deactivating the motor, while allowing over-current conditions caused by actuator obstruction or contact with the mechanical stop at the termination point to deactivate the motor.

While the preferred embodiment of the present invention has been illustrated and described, it is to be understood that the invention is not limited to the precise construction herein disclosed, and the right is reserved to all changes and modifications coming within the scope of the invention as defined in the appended claims.

What is claimed is:

1. A relay control apparatus for providing redundant control of a plurality of pairs of mechanical actuators, one actuator in each pair being a primary actuator and the other actuator in each pair being a secondary actuator, both the primary and secondary actuator in each pair being adapted to perform the same operation, each actuator being driven in a deploy mode from a stow position to a deploy position and in a stow mode from the deploy position back to the stow position by a first motor, comprising:

a plurality of actuator switch means for selecting the operation of each of said actuators, each said actuator switch means corresponding to a pair of said actuators, each said actuator switch means generating an actuator select signal that is in a first state when said switch means is actuated and in a second state otherwise;

deploy/stow switch means for selecting between the deploy and stow operating modes of said actuators, said deploy/stow switch means generating a deploy signal that is in a first state and a stow signal that is in a second state when the deploy operating mode is selected and a deploy signal that is in the second state and a stow signal that is in the first state when the stow operating mode is selected;

actuator select means responsive to the actuator select signals and the deploy and stow signals for producing a plurality of actuator select output signals, there being an actuator select output signal corresponding to the deploy operating mode for each actuator and to the stow operating mode for each actuator, each actuator select output signal being in a first state when the corresponding actuator and operating mode are selected and in a second state when the corresponding actuator and operating mode are not selected;

primary/secondary switch means for selecting between the primary and secondary actuator of each pair of said actuators, said primary/secondary switch means generating a primary signal and a secondary signal, the primary signal being in a first state and the secondary signal being in a second state when the primary actuator of each pair is selected, and the primary signal being in the second state and the secondary signal being in the first state when the secondary actuator of each pair is selected;

primary/secondary select means responsive to the primary and secondary signals and to the actuator select output signals for producing a plurality of motor relay signals, there being a motor relay signal for the deploy mode and the stow mode for each of the primary and secondary actuators, each motor relay signal being in a first state when the actuator and mode to which it corresponds are selected as indicated by the state of the corresponding primary or secondary signal and the state of the actuator select output signal, each motor relay signal being in a second state otherwise; and motor power relay means responsive to the motor relay signals for providing operating power to the first motor that drives the actuator for which the corresponding actuator select output signal and primary signal or secondary signal are in the first state, such operating power driving such motor in the operating mode corresponding to the actuator select output signal that is in the first state.

2. The relay control apparatus as claimed in claim 1 wherein there is a second motor associated with each actuator and each actuator can be driven in the deploy and stow modes by either of the first and second motors, further comprising:

motor select switch means for selecting either the first motors or the second motors to drive the actuators; and second motor power relay means for providing, when the second motors are selected by actuation of said motor select switch means, operating power to the second motor that drives the actuator selected by actuation of one of said plurality of actuator switch means and said primary/secondary switch means in the operating mode selected by actuation of said deploy/stow switch means.

3. A relay control apparatus for providing redundant control of a plurality of pairs of mechanical actuators, one actuator in each pair being a primary actuator and the other actuator in each pair being a secondary actuator, both the primary and secondary actuator in each pair being adapted to perform the same operation, each actuator being driven in a deploy mode from a stow position to a deploy position and in a stow mode from the deploy position back to the stow position by either of a first or a second motor, comprising:

actuator switch means for selecting operation of each pair of actuators, said actuator switch means generating an actuator select signal for each pair of actuators, each actuator select signal being in a first state when the pair of actuators to which it corresponds is selected and in a second state when such pair of actuators has not been selected;

primary/secondary switch means for selecting either the primary or secondary actuator of each pair of actuators, said primary/secondary switch means generating a primary signal that is in a first state and a secondary signal that is in a second state when the primary actuators are selected and a primary signal that is in the second state and a secondary signal that is in the first state when the secondary actuators are selected;

deploy/stow switch means for selecting either the deploy or stow mode of operation for each of the actuators, said deploy/stow switch means generating a deploy signal that is in a first state and a stow signal that is in a second state when the deploy mode is selected and a deploy signal that is in the second state and a stow signal that is in the first state when the stow mode is selected;

motor select switch means for selecting operation of either the first or second motor that drives the actuator selected by actuation of said actuator switch means and said primary/secondary switch means;

first actuator control means responsive to the actuator select signals, the primary and secondary signals and the deploy and stow signals for providing, when the first motor is selected by said motor select means, power to the first motor that drives the primary or secondary actuator selected by actuation of said actuator switch means and said primary/secondary switch means and responsive to the deploy and stow signals for causing such motor to operate in the deploy or stow mode selected by actuation of said deploy/stow switch means; and second actuator control means responsive to the actuator select signals, the primary and secondary signals and the deploy and stow signals for providing, when the second motor is selected by said motor select means, power to the second motor that drives the actuator selected by actuation of said actuator switch means and said primary/secondary switch means and responsive to the deploy and stow signals for causing such motor to operate in the deploy or stow made selected by actuation of said deploy/stow switch means.

4. The apparatus as claimed in claim 3 further comprising:

current sensing means for producing a voltage signal proportional to the amount of current being provided to the motor to which power is being supplied by said first or second actuator control means; and current limiter means responsive to the voltage signal produced by said current sensing means for generating an overcurrent signal when the voltage signal exceeds a predetermined value, wherein power to such motor is interrupted by said first or second actuator control means in response to such overcurrent signal.

5. The apparatus as claimed in claim 4 wherein said current limiter means further comprises:

first reference voltage means for providing a first reference foltage;

first voltage comparator means responsive to the voltage signal produced by said current sensing means and to the first reference voltage, wherein the output impedance of said first voltage comparator means is a high impedance to ground potential when the voltage signal produced by said current sensing means is greater than the first reference voltage, and wherein the output impedance of said first voltage comparator means is a low impedance to ground potential when the voltage signal produced by said current sensing means is not greater than the first reference voltage;

delay circuit means having a low output impedance to ground potential for a predetermined length of time following start up of the motor to which power is supplied by said first or second actuator control means, and said delay circuit means having a high impedance to ground potential after the predetermined length of time; and transistor switching means responsive to the output impedance of both said first voltage comparator means and said delay circuit means, wherein said transistor switching means interrupts power to such motor when output impedances of both said first voltage comparator means and said delay circuit means are high impedances to ground potential.

6. The apparatus as claimed in claim 5 wherein said delay circuit means further comprises:

second reference voltage means for providing a second reference voltage that increases over time from a first level to a higher predetermined level at a predetermined time after start-up of the motor to which power is supplied by said first or second actuator control means; and second voltage comparator means responsive to said first and second reference voltages, wherein the output impedance of said second voltage comparator means is a low impedance to ground potential when the second reference voltage is less than the first reference voltage, and wherein the output impedance of said second voltage comparator means is a high impedance to ground potential when the second reference voltage is greater than the first reference voltage.

7. The apparatus as claimed in claim 1 or 3 further comprising:

arm switch means for generating an arm signal when actuated;

fire switch means for generating a fire signal when actuated;

a plurality of actuator disconnect switch means for selecting the disconnection of any of the primary actuators, each said actuator disconnect switch means generating a disconnect signal when actuated corresponding to a primary actuator to be disconnected;

actuator disconnect select means responsive to the disconnect signals, the arm signal and the fire signal wherein said actuator disconnect select means generates a select arm signal corresponding to each primary actuator for which said actuator disconnect switch means has been actuated upon receipt of an arm signal and wherein said actuator disconnect select means generates a select fire signal corresponding to each primary actuator for which said actuator disconnect switch means has been actuated upon receipt of a fire signal;

a plurality of pyrotechnic pin puller means for disconnecting the actuators, one of said pyrotechnic pin puller means being associated with each of the primary actuator means;

a plurality of pyrotechnic initiator controller means for controlling said pyrotechnic pin puller means, each of said pyrotechnic initiator controller means controlling one of said pyrotechnic pin puller means, each said pyrotechnic initiator controller means generating an electric charge in response to receipt of a corresponding select arm signal from said actuator disconnect select means, and each said pyrotechnic initiator controller means discharging the electrical charge in response to a corresponding select fire signal from said actuator disconnect select means, and wherein said pyrotechnic pin puller means explodes upon receipt of the discharging electrical charge, thereby mechanically disconnecting the corresponding primary actuator from operation.

8. The apparatus as claimed in claim 7 wherein said actuator disconnect select means is inhibited from generating either an arm select signal or a fire select signal except while receiving a secondary signal that is in the first state.

9. The apparatus as claimed in claim 3 further comprising:

separation arm switch means for generating a separation arm signal when actuated;

separation fire swtich means for generating a separation fire signal when actuated;

a pair of pyrotechnic separation means for separating the payload from the support base, wherein each said pyrotechnic separation means is detonatable from either of two detonation points, and wherein detonation of either of said pyrotechnic separation means is sufficient to mechanically separate the payload and the support base; and a pair of separation pyrotechnic initiator controller means, each of said separation pyrotechnic initiator controller means controlling one of said pair of pyrotechnic separation means, each of said separation pyrotechnic initiator controller means generating an electrical charge in response to receipt of a corresponding separation arm signal from said separation arm switch means, and each said separation pyrotechnic initiator controller means discharging to both detonation points of said one of said pair of pyrotechnic separation means the electrical charge in response to a corresponding separation fire signal from said separation fire switch means, and wherein at least one of said pair of pyrotechnic separation means explodes in response to such electrical discharge, thereby separating the payload from the support base.

10. A relay control apparatus for providing redundant control of a plurality of pairs of mechanical actuators, one actuator in each pair being a primary actuator and the other actuator in each pair being a secondary actuator, both the primary and second actuator in each pair being adapted to perform the same operation, each actuator being driven in a first operating mode from a first position to a second position by a first motor, comprising:

actuator select signal generator means for generating a plurality of actuator select signals, there being an actuator select signal corresponding to each pair of said actuators, each actuator select signal being in a first state when the corresponding pair of said actuators is selected to operate and in a second state when the corresponding pair of said actuators is not selected to operate;

actuator select means responsive to the actuator select signals for producing a plurality of actuator select output signals, there being an actuator select output signal for each of said pairs of primary and secondary actuators, each actuator select output signal being in a first state when the corresponding pair of primary and secondary actuators is selected and in a second state when the corresponding pair of primary and secondary actuators is not selected;

primary/secondary signal generator means for generating a primary/secondary signal, the primary/secondary signal being in a first state when the primary actuator of each pair is selected and in the second state when the secondary actuator of each pair is selected;

primary/secondary select means responsive to the primary/secondary signal and to the actuator select output signals for producing a plurality of motor relay signals, there being a motor relay signal for the first operating mode for each of said primary and secondary actuators, each motor relay signal being in a first state when said corresponding primary or secondary actuator is selected as indicated by the state of the corresponding primary/secondary signal and the state of the corresponding actuator select output signal, each motor relay signal being in a second state otherwise; and motor power relay means responsive to the motor relay signals for providing operating power to said first motor that drives said primary actuator for which the corresponding actuator select output signal and primary/secondary signal are in the first state and for providing operating power to said first motor that drives said secondary actuator for which the corresponding actuator select output signal is in the first state and the corresponding primary/secondary signal is in the second state, such operating power driving such first motor in the first operating mode.

11. The relay control apparatus as claimed in claim 10 wherein each said primary and secondary actuator also is driven in a second operating mode from the second position to the first position and wherein said relay control apparatus further comprises;

mode switch means for selecting between the first and second operating modes of said actuators, said mode switch means generating an operating mode signal that is in a first state when the first operating mode is selected and in the second state when the second operating mode is selected; and wherein said actuator select means also is responsive to the operating mode signal and wherein said plurality of actuator select output signals includes first and second actuator select output signals, there being a first actuator select output signal corresponding to the first operating mode for each of said primary and secondary actuators and a second actuator select output signal corresponding to the second operating mode for each of said primary and secondary actuators, each of said first and second actuator select output signals being in a first state when the corresponding actuator and operating mode are selected and in a second state when the corresponding actuator and operating mode are not selected; and wherein said primary/secondary select means is responsive to the first and second actuator select output signals and there is a motor relay signal for each of the first and second operating modes for each of the primary and secondary actuators and wherein each said motor relay signal is in a first state when the actuator and the operating mode to which it corresponds are selected as indicated by the state of the corresponding primary/secondary signal and the state of the corresponding first or second actuator select output signal; and wherein said motor power relay means also provides operating power to said first motor that drives said primary actuator for which the corresponding second actuator select output signal and primary/secondary signal are in the first state and that drives said secondary actuator for which the corresponding second actuator select output signal is in the second state and primary/secondary signal is in the second state, such operating power driving such first motor in the second operating mode.

12. The relay control apparatus as claimed in claim 11 wherein there is a second motor associated with each of said primary and secondary actuators and each of said primary and secondary actuators can be driven in the first and second modes by either of the first and second motors, further comprising:

motor select switch means for selecting either the first motors or the second motors to drive said primary and secondary actuators; and wherein said motor power relay means also provides, when the second motors are selected by actuation of said motor select switch means, operating power to the second motor that drives said primary or secondary actuator selected by one of said first and second actuator select output signals and said primary/secondary signal in the operating mode selected by said mode select switch means.

13. The relay control apparatus as claimed in claim 10 wherein said primary/secondary signal further comprises a primary signal and a secondary signal, the primary signal being in the first state and the secondary signal being in the second state when the primary actuator of each pair is selected and the primary signal being in the second state and the secondary signal being in the first state when the secondary actuator of each pair is selected.

14. A control circuit for controlling the supply of electrical power to a motor comprising:

current sensing means for producing a voltage signal proportional to the amount of current being provided to the motor to which power is being supplied;

first reference voltage means for providing a first reference voltage;

first voltage comparator means responsive to the voltage signal produced by said current sensing means and to the first reference voltage, wherein the output impedance of said first voltage comparator means is a high impedance to ground potential when the voltage signal produced by said current sensing means is greater than the first reference voltage, and wherein the output impedance of said first voltage comparator means is a low impedance to ground potential when the voltage signal produced by said current sensing means is not greater than the first reference voltage;

delay circuit means having a low output impedance to ground potential for a predetermined length of time following start-up of the motor to which power is supplied, and said delay circuit means having a high impedance to ground potential after the predetermined length of time; and transistor switching means responsive to the output impedance of both said first voltage comparator means and said delay circuit means, wherein said transistor switching means interrupts the power being supplied to the motor when the output impedances of both said first voltage comparator means and said delay circuit means are high impedances to ground potential.

15. The apparatus as claimed in claim 14 wherein said delay circuit means further comprises:

second reference voltage means for providing a second reference voltage that increases over time from a first level to a higher predetermined level at a predetermined time after start-up of the motor to which power is supplied; and second voltage comparator means responsive to said first and second reference voltages, wherein the output impedance of said second voltage comparator means is a low impedance to ground potential when the second reference voltage is less than the first reference voltage, and wherein the output impedance of said second voltage comparator means is a high impedance to ground potential when the second reference voltage is greater than the first reference voltage.

* * * * *

UNITED STATES PATENT AND TRADEMARK OFFICE
CERTIFICATE OF CORRECTION

PATENT NO. : 4,939,438

DATED : July 3, 1990

INVENTOR(S) : Richard J. Burtzlaff et al.

It is certified that error appears in the above-identified patent and that said Letters Patent is hereby corrected as shown below:

In the Abstract:

Line 12, delete the word "so"; and
Line 12, "signal" should be --signals--.

Column 1, Line 14, "Electrochemical" should be --Electromechanical--.

Column 7, Line 16, "ssignal" should be -- signal--;
Column 7, Line 54, "ued" should be --used--; and
Column 7, Line 62, "musst" should be --must--.

In the Claims:

Column 14, Line 2 "electric" should be --electrical--.

Signed and Sealed this

Twenty-fourth Day of September, 1991

*Attest:*

HARRY F. MANBECK, JR.

*Attesting Officer*  Commissioner of Patents and Trademarks